United States Patent [19]

Ondracek

[11] Patent Number: 5,044,332
[45] Date of Patent: Sep. 3, 1991

[54] ELLIPTICAL VALVE STEM FOR REDUCING TURBULENCE IN COMBUSTION ENGINES

[76] Inventor: John Ondracek, 1080 Broadway, Apt. #25, Denver, Colo. 80203

[21] Appl. No.: 632,853

[22] Filed: Dec. 24, 1990

[51] Int. Cl.⁵ .............................................. F01L 3/06
[52] U.S. Cl. ...................... 123/188 AA; 123/188 AF; 123/188 A
[58] Field of Search ................. 123/188 AA, 188 AF, 123/188 A; 29/888.4, 888.41; 251/120, 263

[56] References Cited

U.S. PATENT DOCUMENTS

| | | | |
|---|---|---|---|
| 2,090,800 | 8/1937 | MacDonald | 123/41.41 |
| 3,040,417 | 6/1962 | Newton | 123/188 AA |
| 4,475,494 | 10/1984 | Huther | 123/188 A |
| 4,779,584 | 10/1988 | Mosler | 123/188 AA |
| 4,838,219 | 6/1989 | Feuling | 123/188 M |

Primary Examiner—E. Rollins Cross
Assistant Examiner—Erick Solis
Attorney, Agent, or Firm—Henderson & Sturm

[57] ABSTRACT

A valve stem construction (10) including a valve stem member (11) having one end (12) attached to the valve head (103) and provided with a generally elliptical cross sectional profile for reducing the turbulence in fluid passing over the valve stem construction (10).

1 Claim, 1 Drawing Sheet

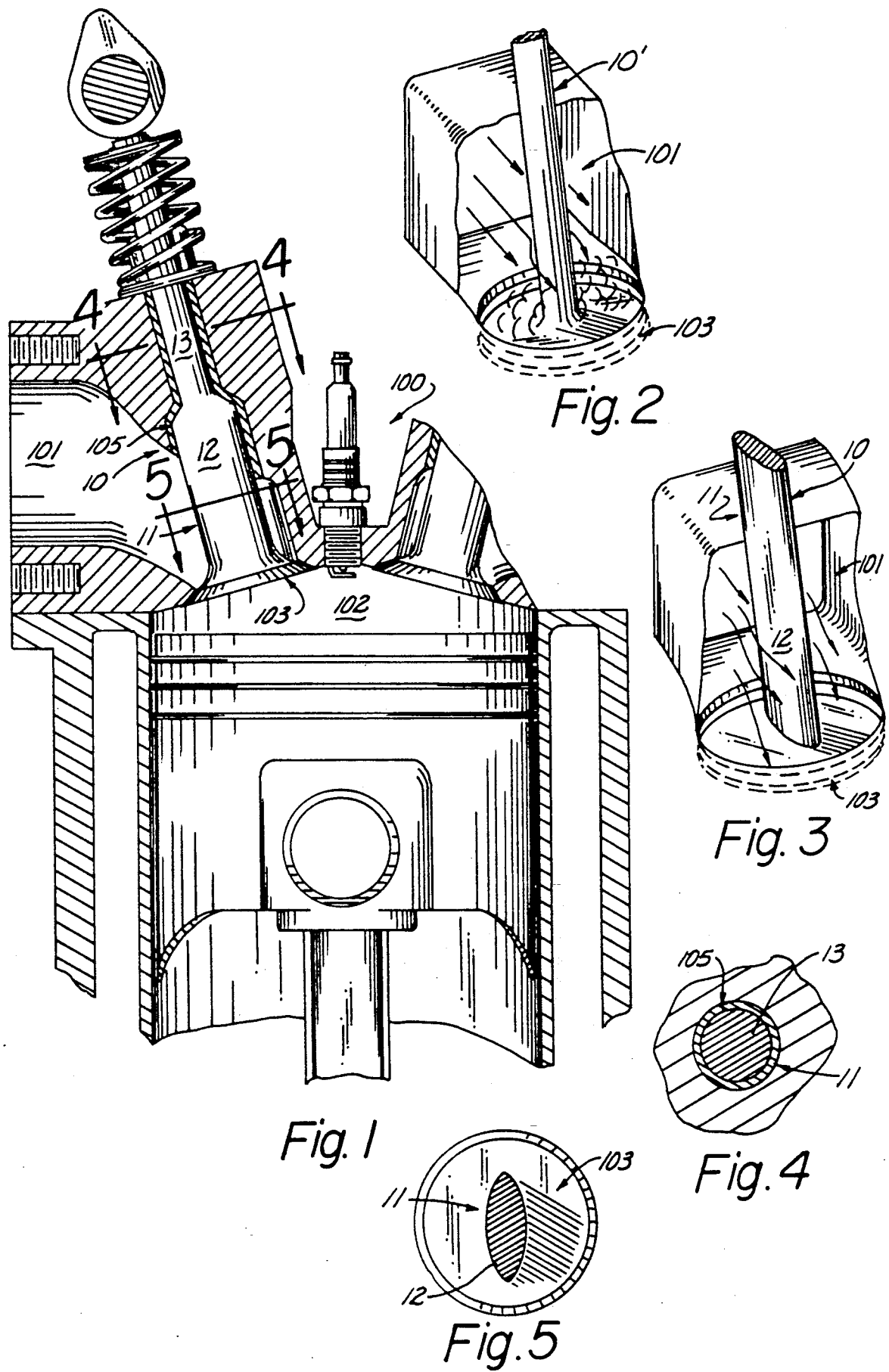

ELLIPTICAL VALVE STEM FOR REDUCING TURBULENCE IN COMBUSTION ENGINES

TECHNICAL FIELD

The present invention relates in general to the field of internal combustion engines, and in particular to a valve stem configuration for reducing turbulence in the fluid entering the piston chamber.

BACKGROUND ART

As can be seen by reference to the following U.S. Pat. Nos. 2,090,800; 4,475,494; 4,779,584; and 4,838,219; the prior art is replete with myriad and diverse engine intake valve constructions.

While all of the aforementioned prior art constructions are more than adequate for the basic purpose and function for which they have been specifically designed, these patented structures are uniformly deficient with regard to their failure to deal with the fluid turbulence that is created by the presence of the cylindrical valve stems that project into the intake chambers of the pistons.

Furthermore, while at least one of the above cited patents recognizes the need for an aerodynamically profiled valve head configuration, none of the cited references even remotely address the problem of turbulence generated by the valve stem.

As a consequence of the foregoing situation, there has existed a longstanding need for a new approach to minimize the fluid turbulence generated in the fluid which is introduced into the piston chamber, and the provision of such a construction is a stated objective of the present invention.

DISCLOSURE OF THE INVENTION

Briefly stated, the elliptical valve stem which forms the basis of the present invention involves the relatively simple expedient of providing a conventional elongated cylindrical valve stem with an aerodynamically configured profile that will substantially reduce the fluid turbulence previously generated by the typical circular cross sectional profile of the cylindrical configuration of the conventional valve stem.

In addition, this invention further contemplates the orientation of the longitudinal axis of the aerodynamic profile and is aligned parallel to the direction of flow of the fluid passing from the fluid intake port into the piston chamber.

As will be explained in greater detail further on in the specification, the aforementioned configuration and orientation of the elliptical valve stem will minimize to the greatest extent possible that portion of the fluid turbulence entering the piston chamber that can be directly attributed to the presence of the valve stem in the mainstream of the fluid flow.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view showing the valve stem of this invention deployed in an internal combustion engine;

FIG. 2 is a perspective view of the turbulence generated by the prior art cylindrical valve stem;

FIG. 3 is a perspective view of the smooth fluid flow generated by this invention;

FIG. 4 is a cross sectional detail view taken through line 4—4 of FIG. 1; and

FIG. 5 is a cross sectional detail view taken through line 5—5 of FIG. 1.

BEST MODE FOR CARRYING OUT THE INVENTION

As can be seen by reference to the drawings, and in particular to FIG. 1, the elliptical valve stem construction that forms the basis of the present invention is designated generally by the reference numeral (10). The construction (10) as indicated previously is specifically designed to reduce the fluid turbulence generated by the presence of a conventional cylindrical valve stem (10') in the fluid flow passing between the fuel intake inlet (100) and the piston chamber (102) in a conventional internal combustion chamber (100).

As can be appreciated particularly by reference to FIG. 2, in the typical prior art arrangement, a generally elongated cylindrical valve stem (10') having a circular cross sectional configuration, is disposed in the mainstream of the fluid flow passing through the fuel intake element (101) as designated by the arrows.

However, as depicted in FIG. 3, due to the aerodynamic profile and orientation of the valve stem construction (10) of this invention, the disruption of the fluid flow passing around the new valve stem construction (10) is drastically reduced.

Turning once more to FIG. 1, it can be seen that the valve stem construction (10) of this invention comprises an elongated valve stem member (11). The valve stem member (11) has one end (12) physically connected to the intake valve head (103) and provided with a generally elliptical aerodynamic profile as depicted in FIGS. 3 and 5.

As can best be seen by reference to FIG. 3, the longitudinal axis of the cross sectional elliptical profile is oriented parallel to the fluid flow through the fuel intake inlet. The aerodynamic profile of the stem construction will reduce fluid turbulence in accordance with well recognized fluid principles.

Furthermore, as can be appreciated by reference to FIGS. 1 and 4, it is not necessary for the entire axial length of the valve stem construction (10) to have an elliptical profile in accordance with the teachings of this invention. However, it is of crucial importance that at least that portion of the valve stem construction (10) that actually enters into the fluid flow during the stroke of the valve stem construction be provided with the aerodynamic profile, while the upper portion (13) of the valve stem member (11) may retain the conventional generally circular cross sectional profile shown in FIG. 4.

In addition, as clearly shown in FIG. 1, at least that portion of the valve stem sleeve (105) that surrounds the elliptical end (12) of the valve stem construction (10) must likewise be provided with an internal elliptical configuration not only for the purpose of accepting the reciprocating passage of the valve stem construction, but also to maintain the longitudinal axis of the cross sectional elliptical profile of the valve stem construction (10) in a parallel orientation relative to the fluid flow through the fuel intake inlet (101).

Having thereby described the subject matter of the present invention, it should be apparent that many substitutions, modifications and variations of the present invention are possible in light of the above teachings. It is therefore to be understood that the invention as taught and described herein is only to be limited to the extent of the breadth and scope of the appended claims.

I CLAIM:

1. A valve stem construction for use in the flow of fluid between the fuel intake inlet and piston chamber of an internal combustion engine wherein the valve stem construction comprises:

an elongated valve stem member having one end physically connected to a valve head disposed between the fuel intake inlet and the piston chamber wherein at least the said one end of the valve stem member is provided with a generally elliptical cross sectional profile and wherein the longitudinal axis of said cross sectional profile is oriented parallel to the fluid flow passing through said fuel intake inlet for reducing the fluid turbulence entering into said piston chamber.

* * * * *